(12) United States Patent
Endo et al.

(10) Patent No.: US 8,377,383 B2
(45) Date of Patent: Feb. 19, 2013

(54) EXHAUST EMISSION CONTROL DEVICE

(75) Inventors: Hiroshi Endo, Tokyo (JP); Noriyuki Takahashi, Tokyo (JP)

(73) Assignee: Hino Motors, Ltd., Hino-shi (JP)

( * ) Notice: Subject to any disclaimer, the term of this patent is extended or adjusted under 35 U.S.C. 154(b) by 370 days.

(21) Appl. No.: 12/678,941

(22) PCT Filed: Mar. 18, 2008

(86) PCT No.: PCT/JP2008/000624
§ 371 (c)(1),
(2), (4) Date: Mar. 18, 2010

(87) PCT Pub. No.: WO2009/037795
PCT Pub. Date: Mar. 26, 2009

(65) Prior Publication Data
US 2010/0196219 A1    Aug. 5, 2010

(30) Foreign Application Priority Data
Sep. 20, 2007    (JP) ................. 2007-243385

(51) Int. Cl.
*B01D 50/00* (2006.01)
(52) U.S. Cl. .......................... 422/177; 422/180
(58) Field of Classification Search .................. 422/177, 422/180
See application file for complete search history.

(56) References Cited

U.S. PATENT DOCUMENTS

| | | | |
|---|---|---|---|
| 3,863,734 A | 2/1975 | Pawlina | |
| 3,921,290 A | 11/1975 | Bailey | |
| 7,470,312 B2 * | 12/2008 | Ohya et al. ................. | 96/386 |
| 2007/0012035 A1 | 1/2007 | Amemiya et al. | |
| 2007/0101703 A1 | 5/2007 | Kanaya et al. | |

FOREIGN PATENT DOCUMENTS

| | | |
|---|---|---|
| FR | 2 882 091 | 8/2006 |
| JP | 58-48708 | 3/1983 |
| JP | 2005 155404 | 6/2005 |
| JP | 2005 273580 | 10/2005 |
| JP | 2006 29233 | 2/2006 |
| JP | 2006 283586 | 10/2006 |
| JP | 2007 40149 | 2/2007 |

OTHER PUBLICATIONS

U.S. Appl. No. 12/738,994, filed Apr. 21, 2010, Kowada.
U.S. Appl. No. 12/742,321, filed May 11, 2010, Kowada, et al.
U.S. Appl. No. 12/677,957, filed Mar. 12, 2010, Kowada, et al.
U.S. Appl. No. 12/679,677, filed Mar. 24, 2010, Kowada.
Supplementary Search Report issued May 9, 2011 in Europe Application No. 08 72 0509.

* cited by examiner

Primary Examiner — Tom Duong
(74) Attorney, Agent, or Firm — Oblon, Spivak, McClelland, Maier & Neustadt, L.L.P.

(57) ABSTRACT

In an exhaust emission control device, a selective reduction catalyst 5 having a property capable of selectively reacting $NO_x$ with ammonia even in the presence of oxygen is incorporated as $NO_x$ reduction catalyst in an exhaust pipe 4 and a particulate filter 13 is arranged upstream of the catalyst. Arranged in front of the particulate filter 13 is a burner 14 for injection of fuel in moderate quantity for ignition and combustion. Interposed between the particulate filter 13 and the selective reduction catalyst 5 is an oxidation catalyst 15 which conducts oxidation treatment of unburned HC in the exhaust gas 3 and urges oxidation reaction of NO in the exhaust gas 3 into $NO_2$.

3 Claims, 5 Drawing Sheets

EXHAUST EMISSION CONTROL DEVICE

TECHNICAL FIELD

The present invention relates to an exhaust emission control device.

BACKGROUND ART

It has been recently proposed that a particulate filter for capturing particulates in exhaust gas is incorporated in an exhaust pipe and a selective reduction catalyst capable of selectively reacting $NO_x$ with ammonia even in the presence of oxygen is arranged downstream of the particulate filter, urea water as reducing agent being added between the selective reduction catalyst and the particulate filter, thereby attaining reduction of both the particulates and $NO_x$.

Such addition of the urea water to the selective reduction catalyst is conducted between the particulate filter and the selective reduction catalyst. Thus, in order to ensure sufficient reaction time for pyrolysis of the urea water added to the exhaust gas into ammonia and carbon dioxide gas, it is necessary to prolong a distance between a urea water added position and the selective reduction catalyst. However, such arrangement of the particulate filter and the selective reduction catalyst substantially spaced apart from each other will extremely impair the mountability on a vehicle.

In order to overcome this, a compact exhaust emission control device as shown in FIGS. 1 and 2 has been proposed by the inventor as Japanese patent application No. 2007-29923. In the exhaust emission control device of the prior application shown, incorporated in an exhaust pipe 4 through which exhaust gas 3 flows from a diesel engine 1 via an exhaust manifold 2 is a particulate filter 5 housed in a casing 7 to capture particles in the exhaust gas 3; arranged downstream of and in parallel with the particulate filter 5 and housed in a casing 8 is a selective reduction catalyst 6 having a property capable of selectively reacting $NO_x$ with ammonia even in the presence of oxygen. A rear end of the particulate filter 5 is connected to a front end of the selective reduction catalyst 6 through an S-shaped communication passage 9 such that the exhaust gas 3 discharged through the rear end of the particulate filter 5 is forwardly curved back into the front end of the adjacent selective reduction catalyst 6.

As shown in FIG. 2 which shows substantial parts in enlarged scale, the communication passage 9 is the S-shaped structure comprising a gas gathering chamber 9A which encircles the rear end of the particulate filter 5 to gather the exhaust gas 3 through collision of the gas just discharged from the rear end of the particulate filter 5 against a wall surface and substantially perpendicular turnabout of the gas, a mixing pipe 9B which extracts forward the gathered exhaust gas 3 from the chamber 9A and which is provided with an injector 10 for urea water addition (urea water addition means) intermediately of the mixing pipe and a gas dispersing chamber 9C which encircles the front end of the selective reduction catalyst 6 so as to disperse the gas 3 guided by the mixing pipe 9B through collision of the gas against a wall surface and substantially perpendicular turnabout of the gas into the front end of the selective reduction catalyst 6.

Arranged in the casing 7 and in front of the particulate filter 5 is an oxidation catalyst 11 for oxidization treatment of unburned fuel in the exhaust gas 3, and arranged in the casing 8 and behind the selective reduction catalyst 6 is an ammonia reducing catalyst 12 for oxidization treatment of surplus ammonia.

With such construction being employed, particulates in the exhaust gas 3 are captured by the particulate filter 5. The urea water is added intermediately of the mixing pipe 9B and downstream of the filter into the exhaust gas 3 by the injector 10 and is pyrolyzed into ammonia and carbon dioxide gas, so that $NO_x$ in the exhaust gas 3 is favorably reduced and depurated by the ammonia on the selective reduction catalyst 6. As a result, both the particulates and $NO_x$ in the exhaust gas 3 are reduced.

In this case, the exhaust gas 3 discharged through the rear end of the particulate filter 5 is forwardly curved back by the communication passage 9 into the front end of the adjacent selective reduction catalyst 6. As a result, enough reaction time is ensured for production of ammonia from the urea water since a long distance between the urea water added position intermediately of the communication passage 9 and the selective reduction catalyst 6 is ensured and the flow of the exhaust gas 3 becomes turbulent due to the reversed curving to facilitate mixing of the urea water with the exhaust gas 3.

Moreover, the particulate filter 5 and selective reduction catalyst 6 are arranged in parallel with each other and the communication passage 9 is arranged between and along the particulate filter 5 and selective reduction catalyst 6, so that the whole structure becomes compact in size to substantially improve its mountability on a vehicle.

As a prior art literature pertinent to the invention, there exists, for example, the following Patent Literature 1.

[Patent Literature 1] JP 2005-155404A

SUMMARY OF INVENTION

Technical Problems

However, the gas gathering chamber 9A provides an exhaust passage in the direction different from the axis of the casing 7 for substantially perpendicular turnabout of the exhaust gas 3, so that when a connecting flange is used for connection of the gas gathering chamber 9A to the casing 7, disadvantageously the flange cannot be fastened all over its peripheral direction since some portions of the flange to be fastened are obstructed by the exhaust passage. Moreover, the exhaust gas which becomes turbulent in the gas gathering chamber 9A fails in favorable flow-down to the mixing pipe. Furthermore, it has been desired to enhance the rigidity of the gas gathering chamber 9A and the like.

The invention was made in view of the above and has its object to provide an exhaust emission control device in which a connecting flange for connection of a gas gathering chamber is reliably fastened, the exhaust gas in the gas gathering chamber being caused to favorably flow down, the rigidity of the gas gathering chamber and the like being enhanced.

Solution to Problems

The invention is directed to an exhaust emission control device wherein an aftertreatment device for depuration of exhaust gas through passing of the gas therethrough is arranged in a casting and incorporated in an exhaust passage, said casing having an outlet connected through a connecting flange with a gas gathering chamber which in turn provides an exhaust passage in a direction different from an axis of said casing, characterized in that said gas gathering chamber is provided with a mounting portion which extends through the exhaust passage to provide a mounting opening for fastening of the connecting flange from outside, the mounting portion providing said mounting opening being provided at an outer periphery thereof with a curved surface for flow rectification of the exhaust gas.

Thus, the gas gathering chamber has the mounting opening through which the connecting flange may be fastened from outside, so that when the connecting flange is used for connection of the gas gathering chamber, portions of the connecting flange to be fastened are not obstructed by the exhaust passage, resulting in reliable fastening of the connecting flange. Moreover, the mounting portion which provides the mounting opening is provided at its outer periphery with the curved surface for flow rectification of the exhaust gas, so that upon flow-down of the exhaust gas through the exhaust passage in the gas gathering chamber, a phenomenon of fluid separation from the surrounding surface is suppressed to reduce the turbulence, resulting in favorable flow-down of the exhaust gas. Furthermore, the surfaces of the gas gathering chamber is supported by the mounting portion which provides the mounting opening so that rigidity of the gas gathering chamber and the like can be enhanced.

It is preferable in the invention that the gas gathering chamber has an outlet connected with a communication body which provides a second exhaust passage directed in a direction different from the direction of the exhaust passage, the gas gathering chamber being provided with a rectifying member which extends from the mounting portion providing the mounting opening to an inlet of the communication body. This further suppresses the phenomenon of fluid separation from the mounting portion to substantially reduce the turbulence, resulting in favorable flow-down of the exhaust gas to downstream. The surfaces of the gas gathering chamber are supported by the rectifying member, so that the rigidity of the gas gathering chamber can be enhanced. Moreover, the mounting portion is provided with the rectifying member, which can enhance the rigidity of the rectifying member.

It is also preferable in the invention that the exhaust passage is zoned by the mounting portion and the rectifying member into a passage space where the exhaust gas is rectified to flow down and a detention space where the exhaust gas lingers. With thus constructed, the passage space provides the exhaust passage of the exhaust gas and the detention space exerts heat-retention effect, so that the exhaust gas can be caused to favorably flow down to downstream.

ADVANTAGEOUS EFFECTS OF INVENTION

An exhaust emission control device according to the invention as mentioned in the above can exert various excellent effects that when the gas gathering chamber is connected through the connecting flange, the exhaust passage provides no obstruction against the portions of the connecting flange to be fastened so that the connecting flange can be reliably fastened, that the exhaust gas in the gas gathering chamber is caused to favorably flow down to downstream and that the rigidity of the gas gathering chamber and rectifying member can be enhanced.

Figure 1:
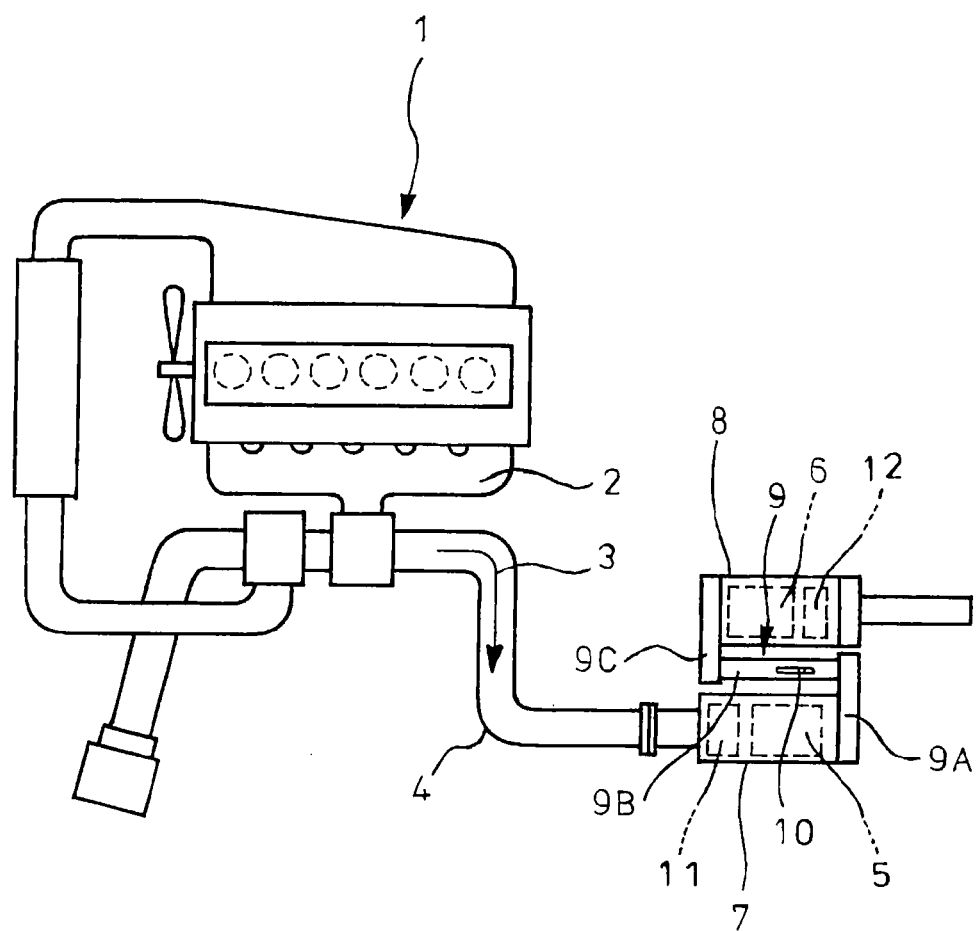
FIG. 1 is a schematic view showing a conventional device.

REFERENCE SIGNS LIST 5 particulate filter (aftertreatment device)
7 casing
9A gas gathering chamber
9B mixing pipe (communication body)
13 first exhaust passage
13A passage space
13B detention space
14 second exhaust passage
21 connecting flange
22 connecting flange
25 mounting opening
26 mounting portion
26a curved surface
28 inlet
29 first rectifying member

DESCRIPTION OF EMBODIMENT

An embodiment of the invention will be described in conjunction with the drawings.

Figure 2:
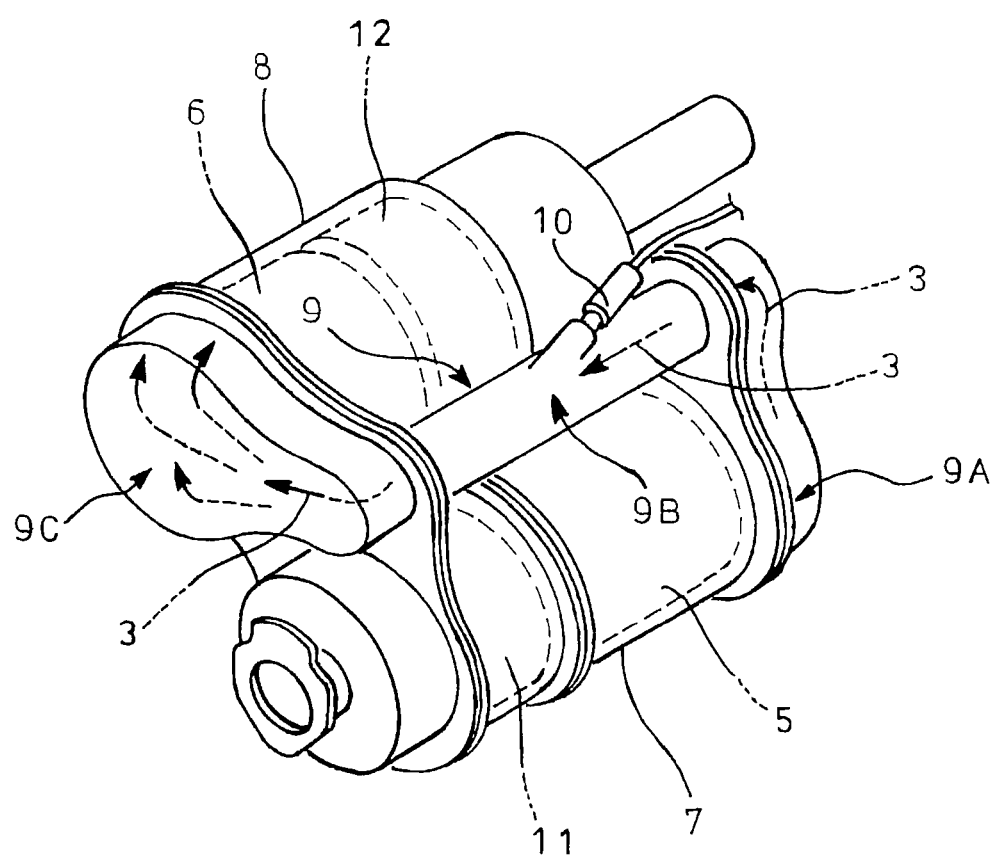
FIG. 2 is a perspective view showing substantial portions in FIG. 1 in enlarged scale.
Figure 3:
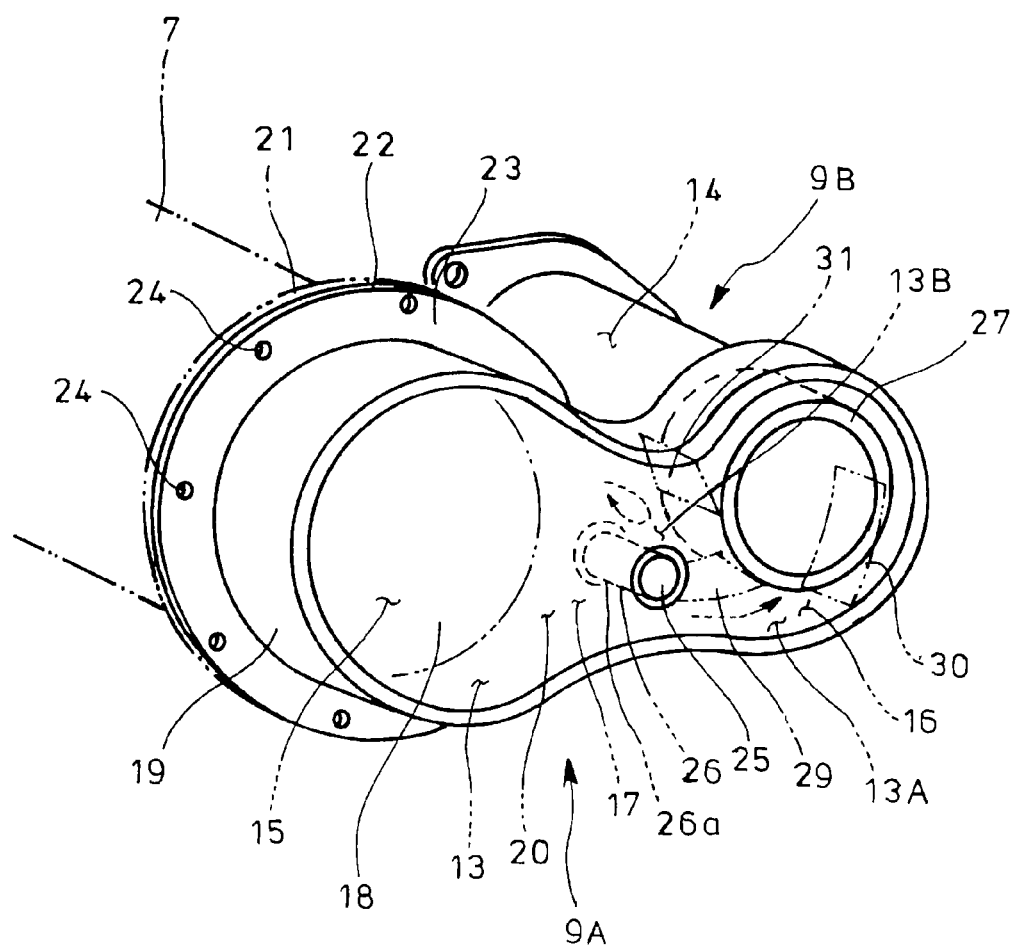
FIG. 3 is a schematic view showing an embodiment of the invention.
Figure 4:
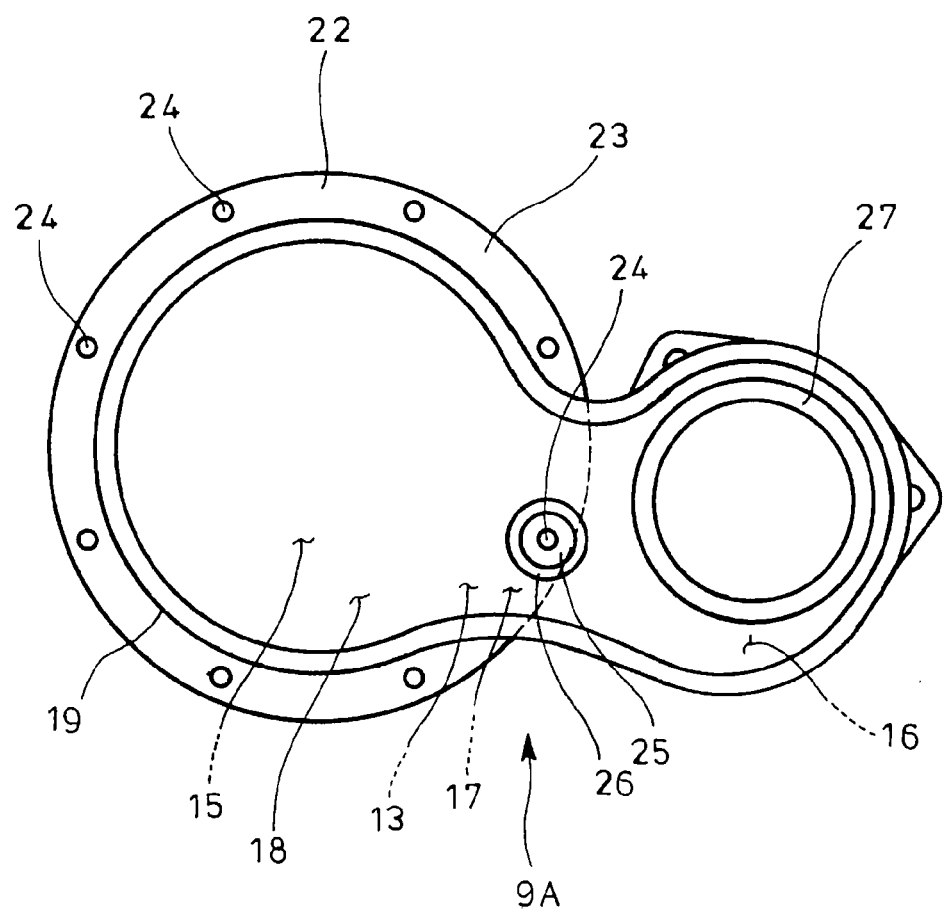
FIG. 4 is a front view showing the embodiment of the invention.
Figure 5:
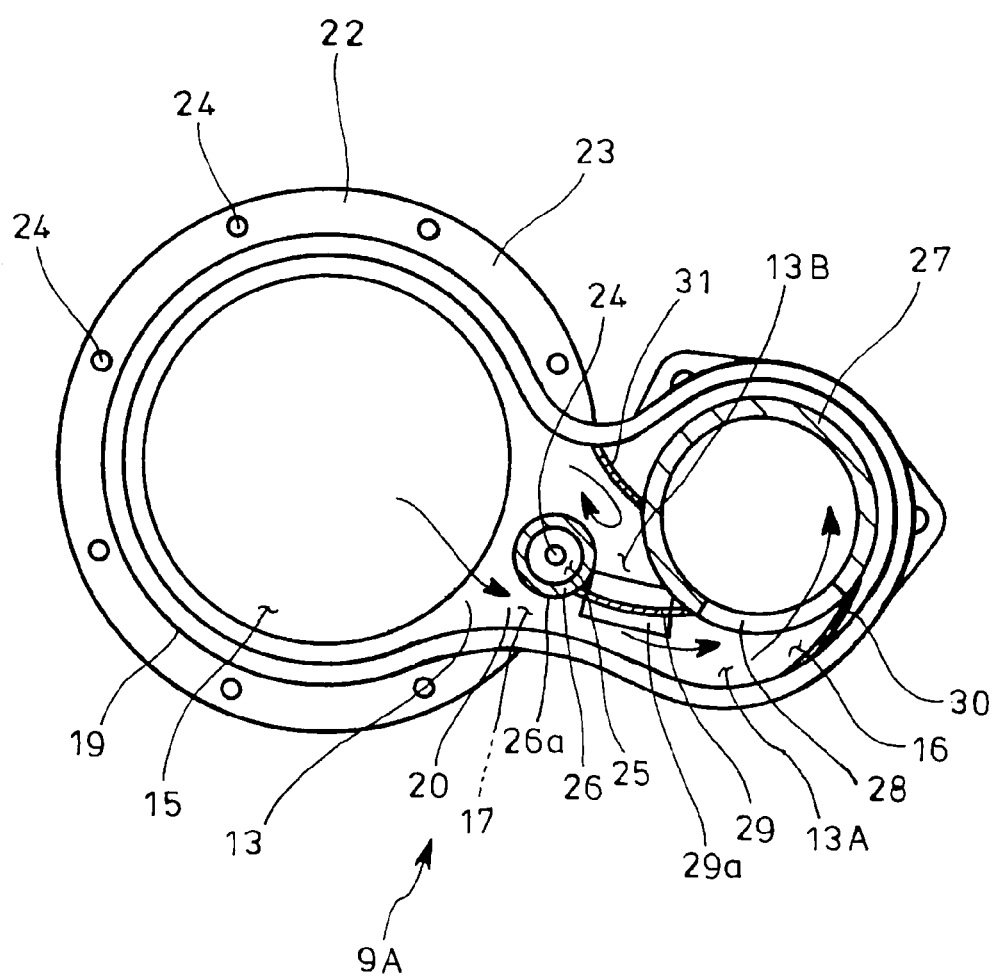
FIG. 5 is a front view showing in section the embodiment of the invention.

FIGS. 3-5 show an embodiment of the invention. In the embodiment directed to an exhaust emission control device which is substantially similar in structure to that shown in FIGS. 1 and 2 mentioned in the above, a casing 7 with a particulate filter 5 (aftertreatment device) having an outlet connected with a gas gathering chamber 9A which in turn provides a first exhaust passage 13 in a direction substantially perpendicular to (or different from) an axis of the casing 7. The gas gathering chamber 9A has an outlet connected with a mixing pipe 9B (communication body) which in turn provides a second exhaust passage 14 in a direction substantially perpendicular to (or different from) the direction of flow of the exhaust passage 13 so that it may be substantially in parallel with the axis of the casing 7.

The gas gathering chamber 9A includes an entry internal space 15 provided at the inlet and corresponding in diameter to the casing 7, an exit internal space 16 provided at the outlet and corresponding in diameter to the mixing pipe 9B (communication body) and an intermediate internal space 17 for interconnection of entry and exit internal spaces 5 and 6, these internal spaces 15, 16 and 17 being defined by a flat front plate 18 facing to outside, a side plate 19 surrounding the front plate 18 and a flat rear plate 20 connected to the side plate 19 for formation of the intermediate internal space 7.

The gas gathering chamber 9A has an inlet with a connecting flange 22 in correspondence with a connecting flange 21 formed at the outlet of the casing 7. The connecting flange 22 of the gas gathering chamber 9A and the connecting flange 21 of the casing 7 are formed with holes 24 in a predetermined spaced-apart relationship along a peripheral edge 23, the connecting flanges 22 and 21 being capable of fastened together using fastening means such as bolts and nuts (not shown) for the holes 24. A spacer or plate may be interposed between the connecting flange 22 of the gas gathering chamber 9A and the connecting flange 21 of the casing 7. Alternatively, connection of the gas gathering chamber 9A with the casing 7 may be provided by a connecting flange formed on one of them, the other being of any construction connectable therewith.

In the gas gathering chamber 9A, with respect to one or some (one in FIGS. 3-5) of the holes 24 on the connecting flange 22 that is overlapped by the front and rear plates 18 and 20, a mounting opening 25 is provided for access from outside of the chamber to the very position(s) to be fastened on the connecting flange 22. The mounting opening 25 is provided by a cylindrical mounting portion 26 which extends through the first exhaust passage 13 and which has upper and lower ends fixed in welding to the front and rear plates 18 and 20, respectively, so as to enhance the rigidity of the gas gathering chamber 9A. The mounting portion 26 providing the mounting opening 25 is provided at its outer periphery with an arc- or wing-like curved surface 26*a* so as to prevent fluid separation of the exhaust gas upon flow-down of the gas. There is no specific restriction with respect to a diameter of the mounting opening 25, provided that fastening means (not shown) such as bolt and nut may be inserted through the opening for arrangement at the hole 24 of the connecting flange 22; however, it is preferable that the opening is of a size which allows insertion of a socket (not shown) of an impact wrench or other tool (not shown) for fixing of the fastening means.

Arranged at an outlet of the gas gathering chamber 9A is an entry cylindrical body 27 provided by a tip of the mixing pipe 9B (communication body). The entry cylindrical body 27 of the mixing pipe 9B (communication body) is partly cut out at its side surface to provide an inlet 28 leading from the gas gathering chamber 9A to the mixing pipe 9B (communication body).

Further, first and second rectifying members 29 and 30 are arranged in the gas gathering chamber 9A, the former extending from the mounting portion 26, which provides the mounting opening 25, to one side edge of the inlet 28 of the mixing pipe 9B (communication body), the latter extending from an inner surface of the side plate 19, which constitutes the gas gathering chamber 9A, to the other side edge of the inlet 28 of the mixing pipe 9B (communication body). The first rectifying member 29 is fixed in welding to the outer periphery of the mounting portion 26 and fixed via a seat 29*a* to the rear plate 20 of the gas gathering chamber 9A and is inserted into the inlet 28 of the mixing pipe 9B (communication body) in abutting contact with the one side edge.

The first exhaust passage 13 of the gas gathering chamber 9A is zoned by the mounting portion 26 and first rectifying member 29 into a passage space 13A where the exhaust gas is rectified to flow down and a detention space 13B where the exhaust gas lingers. In the detention space 13B, a partition member 31 is arranged to extend from the inner surface of the side plate 19 to the cylindrical body 27 for prevention of the exhaust gas from reaching backwardly of the cylindrical body 27.

Next, mode of operation of the embodiment according to the invention will be described.

Attachment of the gas gathering chamber 9A to the casing 7 is conducted such that the connecting flange 22 of the former and the connecting flange 21 of the latter are fastened together by the fastening means such as bolts and nuts using the impact wrench or other tool. In this case, where one or some of the holes 24 on the connecting flange 22 is overlapped by the arrangement of first exhaust passage 13, the fastening means such as bolt and nut are fixed using the impact wrench or other tool through the mounting opening 25.

The exhaust gas flows down through the gas gathering chamber 9A in such a manner that the exhaust gas from the casing 7 is caused to flow down to the mixing pipe 9B (communication body) through the entry, intermediate and exit internal spaces 15, 17 and 16. In this case, the exhaust gas is rectified in the passage space 13A by the outer periphery of the mounting portion 26 and the first and second rectifying members 29 and 30 for prevention of turbulence due to the fluid separation of the gas, and is caused to flow down to the inlet 28 of the mixing pipe 9B (communication body) while part of the exhaust gas lingers in the detention space 13B to exert heat-retention effect.

Thus, according to the above embodiment, in the gas gathering chamber 9A, the mounting opening 25 is provided by the mounting portion 26 extending through the exhaust passage 13, so that connection of the gas gathering chamber 9A through the connecting flange 22 is not obstructed by the exhaust passage 13 and the edge 23 of the connecting flange 22 can be reliably fastened all over its periphery at the holes 24. The mounting portion 26 providing the mounting opening 25 is provided with the curved surface 26*a* for flow rectification of the exhaust gas, so that upon flow-down of the exhaust gas in the first exhaust passage 13, the phenomenon of fluid separation from the outer periphery of the mounting portion 26 and the like is suppressed to reduce the turbulence, resulting in favorable flow-down of the exhaust gas to downstream. Moreover, the front and rear plates 18 and 20 of the gas gathering chamber 9A are supported by the mounting portion 26 constituting the mounting opening 25, so that rigidity of the gas gathering chamber 9A and first rectifying member 29 can be enhanced.

The outlet of the gas gathering chamber 9A is connected with the mixing pipe 9B (communication body) which provides the second exhaust passage 14 in the direction different from the flow direction of the exhaust passage 13, and the first rectifying member 29 is arranged in the gas gathering chamber 9A to extend from the mounting portion 26, which provides the mounting opening 25, to the inlet 28 of the mixing pipe 9B (communication body), so that the phenomenon of fluid separation from the mounting portion 26 is further suppressed to substantially reduce the turbulence, resulting in favorable flow-down of the exhaust gas to downstream. Moreover, the front and rear plates 18 and 20 of the gas gathering chamber 9A is supported by the first and second rectifying members 29 and 30, so that the rigidity of the gas gathering chamber 9A can be enhanced. Furthermore, the first rectifying member 29 is fixed to the mounting opening 25 or the like, so that the rigidity of first rectifying member 29 can be enhanced.

When the exhaust passage 13 is zoned by the mounting portion 26 and first rectifying member 29 into the passage space 13A where the exhaust gas is rectified to flow down and the detention space 13B where the exhaust gas lingers and the passage space 13A provides the exhaust passage for the exhaust gas and the detention space 13B provides heat-retention effect, so that the exhaust gas can be caused to favorably flow down to downstream.

It is to be understood that an exhaust emission control device according to the invention is not limited to the above-mentioned embodiment and that various changes and modifications may be made without departing from the scope of the invention. For example, in the above embodiment, the first exhaust passage is not always limited to be directed substantially perpendicular to the axis of the casing and may be directed in any direction different from the axis of the casing. The second exhaust passage is not limited to be directed substantially perpendicular to the direction of the first exhaust passage and may be directed in any direction different from the direction of the first exhaust passage. The mounting opening and/or mounting portion may be provided in plural depending upon the number of holes of the connecting flange. The gas gathering chamber has no restriction in shape provided that it can exert the effects of the invention.

The invention claimed is:

1. An exhaust emission control device wherein an aftertreatment device for depuration of exhaust gas through passing of the gas therethrough is arranged in a casing and incorporated in an exhaust passage, said casing having an outlet connected through a connecting flange with a gas gathering chamber which in turn provides an exhaust passage in a direction different from an axis of said casing, comprising:

said gas gathering chamber provided with a mounting portion which extends through the exhaust passage to provide a mounting opening for fastening of the connecting flange from outside, the mounting portion providing said mounting opening being provided at an outer periphery thereof with a curved surface for flow rectification of the exhaust gas, wherein the gas gathering chamber has an outlet connected with a communication body which provides a second exhaust passage in a direction different from the flow direction of the exhaust passage, said gas gathering chamber being provided with a rectifying member which extends from the mounting portion providing the mounting opening to the inlet of said communication body.

2. An exhaust emission control device as claimed in claim 1, wherein the exhaust passage is partitioned by the mounting portion and the rectifying member into a passage space where the exhaust gas is rectified to flow down and a detention space where the exhaust gas lingers.

3. An exhaust emission control device wherein an aftertreatment device for depuration of exhaust gas through passing of the gas therethrough is arranged in a casing and incorporated in an exhaust passage, said casing having an outlet connected through a connecting flange with a gas gathering chamber which in turn provides an exhaust passage in a direction different from an axis of said casing, comprising:

said gas gathering chamber provided with a mounting portion which extends through the exhaust passage to provide a mounting opening for fastening of the connecting flange from outside, the mounting portion providing said mounting opening being provided at an outer periphery thereof with a curved surface for flow rectification of the exhaust gas, wherein the exhaust passage is partitioned by the mounting portion and a rectifying member into a passage space where the exhaust gas is rectified to flow down and a detention space where the exhaust gas lingers.

* * * * *